(12) United States Patent
Moreaux

(10) Patent No.: US 6,925,088 B1
(45) Date of Patent: Aug. 2, 2005

(54) DATA TRANSMISSION SYSTEM FOR AIRCRAFT

(75) Inventor: Jean-Paul Moreaux, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 864 days.

(21) Appl. No.: 09/712,833

(22) Filed: Nov. 13, 2000

(30) Foreign Application Priority Data

Nov. 12, 1999 (DE) .......................................... 199 54 377

(51) Int. Cl.[7] ........................... H04L 12/28; H04L 12/56
(52) U.S. Cl. ....................... 370/407; 370/400; 370/474
(58) Field of Search .................................... 370/315–322, 370/389, 392, 400, 401, 407, 466, 465, 474; 709/252

(56) References Cited

U.S. PATENT DOCUMENTS

| | | | | |
|---|---|---|---|---|
| 5,450,395 A | * | 9/1995 | Hostetter et al. | 370/320 |
| 6,157,623 A | * | 12/2000 | Kerstein | 370/315 |
| 6,584,080 B1 | * | 6/2003 | Ganz et al. | 370/315 |

* cited by examiner

*Primary Examiner*—Ajit Patel
(74) *Attorney, Agent, or Firm*—W. F. Fasse; W. G. Fasse

(57) ABSTRACT

A data transmission system for aircraft is formed by a global transmission network that includes at least one subnet with at least one star distributor. At least one peripheral unit is connected to the star distributor. The star distributor is so wired or circuit connected that each subnet forms a cross-distributor for a respective peripheral unit connected to the subnet.

17 Claims, 4 Drawing Sheets

DATA TRANSMISSION SYSTEM FOR AIRCRAFT

PRIORITY CLAIM

This application is based on and claims the priority under 35 U.S.C. §119 of German Patent Application 199 54 377.1, filed on Nov. 12, 1999, the entire disclosure of which is incorporated herein by reference.

FIELD OF THE INVENTION

The invention relates to a data transmission system primarily for use in aircraft, particularly passenger aircraft. Its various data transmission components are interconnected with particular regard to the requirements for data transmissions within an aircraft.

BACKGROUND INFORMATION

Various specific data busses have been developed for data transmissions in an aircraft for handling ever increasing data volumes. However, such increasing volumes show that the available bandwidth is generally no longer sufficient. Stated differently, any increase in the available bandwidth is accompanied by substantial cost increases.

Thus, attempts have been made to fall back on using commercial standards for data transmission. However, commercial standards are not usable in most instances in an aircraft, because commercial standards frequently do not satisfy the higher requirements that must be satisfied for aircraft with regard to the reliability and operational certainty or determinism of the data transmission.

OBJECTS OF THE INVENTION

In view of the above it is the aim of the invention to achieve the following objects singly or in combination:

to provide a data transmission system which employs commercial data busses while simultaneously meeting the high reliability requirements for aircraft with regard to a transparent and deterministic data transmission;

generally to make commercial data transmission components including data transmission busses sufficiently reliable for use in aircraft;

to combine commercial and aircraft specific data busses in a data transmission system for use in aircraft without thereby reducing the system reliability; and to construct a data transmission system in such a way that certain conventional access controls are no longer necessary and that transmission data need no longer be compared with reception data to make the present system more efficient than conventional systems.

SUMMARY OF THE INVENTION

The data system according to the invention is characterized by a global network that includes at least one, preferably a plurality of subnets within the global network. Each subnet comprises at least one star distributor and the system includes at least one, preferably a plurality of peripheral units connected to the respective star distributor. The at least one star distributor in turn is so connected or wired that each subnet forms a cross distributor for the peripheral units that are connected to the subnet.

It is a particular advantage of the data transmission system according to the invention that a successive transition or migration is possible from the data busses specifically developed for aircraft to commercial data busses. As a result it is now possible to integrate commercial data busses with data busses specifically developed for aircraft applications. Thus, according to the invention it is now possible to use specific aircraft data busses in combination with commercial data busses whereby the costs for the development and government certification have been substantially reduced according to the invention.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
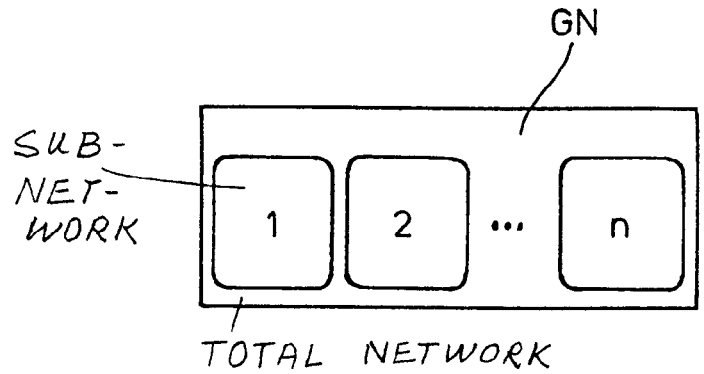
FIG. 1 illustrates the principle of the basic construction of a data transmission system according to the invention.

FIG. 1 shows in block form the basic construction of a data transmission system according to the invention comprising a global network GN assembled from one or more subnets 1,2, . . . n. Each of the subnets is implemented in accordance with the layer or level TWO of an OSI reference model. Layer TWO is a "data link" layer of an OSI (open systems interconnection) reference model according to ISO 7498 (International Organization for Standardization). The subnets 1,2, . . . n are constructed either completely separately or they are coupled with one another on a higher logical communication plane, for example the OSI "network" layer THREE. The OSI "physical" layer ONE and the basics for the access control to the medium ("link" layer TWO) are based on the International Standard IEEE 802.3 (1998), which is known as "Ethernet" and which is incorporated herein by reference. Due to the central position of the present data transmission system it can be used simultaneously for data transmission and for network management for connected data busses. The basis for the combination of transmission and management is, on the one hand, known methods and protocols in accordance with ARINC/AEEC. On the other hand, known methods and protocols that are suitable for the group of data busses described herein may be applied. Additionally, it is possible with the aid of the present data transmission system to construct connections in layer THREE of the OSI reference model. The layer THREE is also referred to as the network layer as mentioned above.

Figure 2:
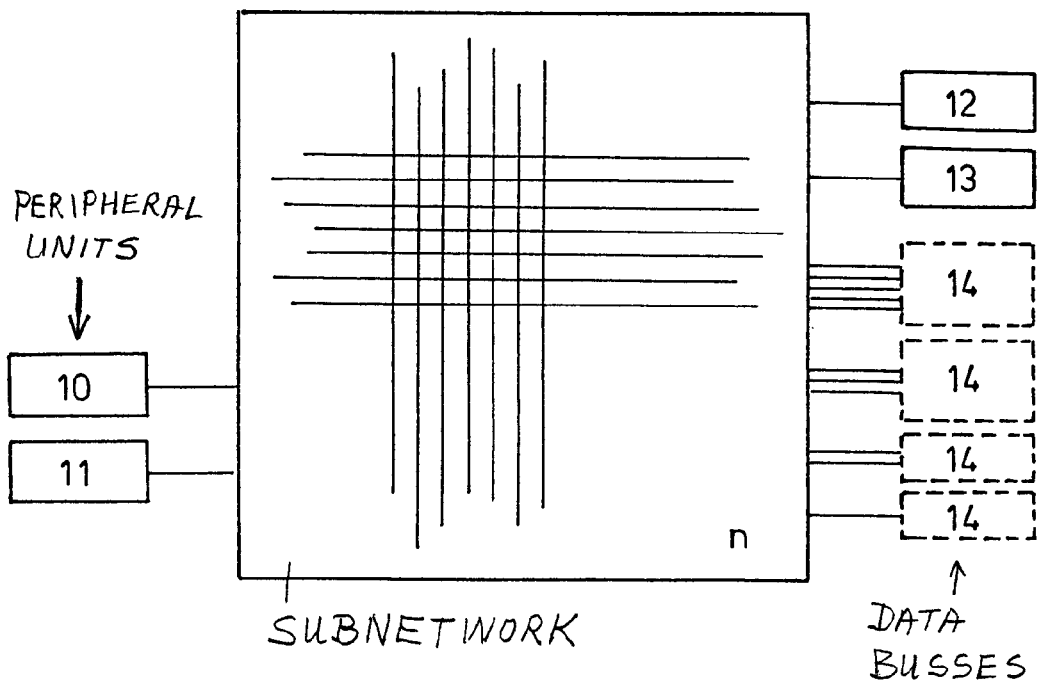
FIG. 2 is a schematic block diagram showing a subnet connected to peripheral units and to data busses.

FIG. 2 illustrates the basic structure of any subnet n with a plurality of peripheral devices and/or peripheral units 10, 11, 12, 13 connected to the subnet n. Further, data bus systems 14 such as ARINC 429, ARINC 629 and ARINC 636 are also connected to the subnet n. The subnet n functions as a cross distributor for the peripheral units 10–13 such as computers, closed loop controllers and so forth. As a result, each peripheral device or unit can directly exchange data with any other peripheral device or unit.

In this context, both the subnet as well as each peripheral unit 10, 11, 12, 13 function respectively as an integral component and also both as a transmitter and as a receiver. The addressing uses an identification of the receiver or of the transmitter to thereby permit any of the following communications: any transmitter to any receiver (unicast, peer-to-peer communication), any transmitter to groups of receivers (multicast communication) or any transmitter to all receivers (broadcast communication). According to the invention the number of peripheral units that may be connected to the subnet n is basically only limited by the number of available addresses which is larger than $7 \times 10^{13}$. This characteristic of the present system is contrary to the aircraft specific data busses ARINC 429 handling less than 20 peripheral units or ARINC 629 handling less than 120 peripheral units which basically transmit to all subscribers of the respective physical bus and which identify the content of the transmitted message. Further, the above-mentioned aircraft specific ARINC data busses are coupled through a transmission function or so-called gateway.

Figure 3:
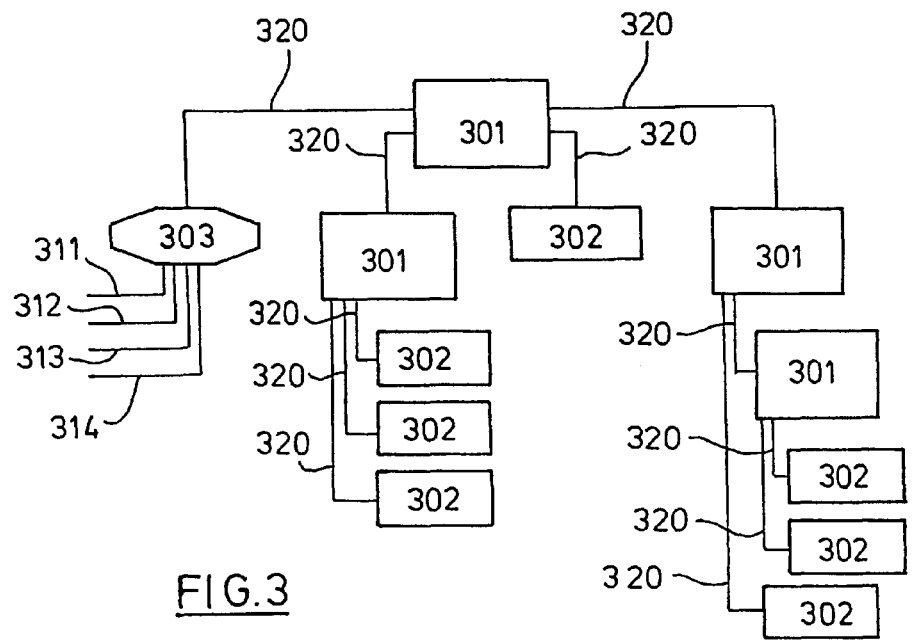
FIG. 3 is a functional block diagram of a subnet.
Figure 4:
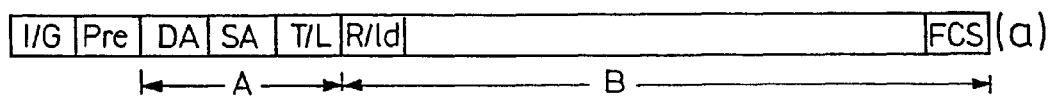
FIGS. 4A and 4B illustrate frame structures for different data formats.
Figure 4:
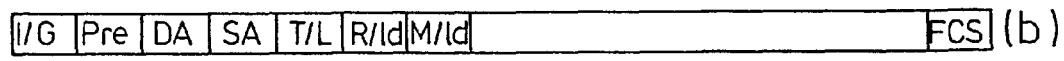

FIG. 3 illustrates an example structure of a subnet n. The subnet n comprises four substantially identical star distributors 301 to which are connected one or several peripheral units or devices 302 through a respective data connection or bus 320. Starting from one of the star distributors 301 having several peripheral units connected thereto, a structure is assembled which is oriented or configured to meet the operational requirements of the respective aircraft. For this purpose it is for example possible to couple a star distributor 301 through data connections or busses 320 to other star distributors 301.

It is further possible to connect converters 303 through data connections 320 whereby these converters 303 establish a connection to other data busses or to other data transmission systems. Such other data transmission systems include aircraft specific systems such as data bus' systems 311 (ARINC 429) or 312 (ARINC 629) or 313 (ARINC 636) as well as all commercial data bus systems 314.

Primarily, however, peripheral units 302 such as computers, controllers, closed loop controllers, and so forth are connected to the star distributor 301 through the data connections 320. In any event it is assumed that the peripheral units 302 perform very diversified functions and thus may be constructed differently from one another. However, all peripheral units or devices are linked to one another by the same type of data transmission and that applies to their function as a transmitter and to their function as a receiver. The same consideration applies to the star distributors 301. These star distributors may differ from one another in their structure depending on the following requirements: The number of data connections or busses 320 that must be connected to the star distributors, the performance and the installation. However, it is common to all star distributors that they have an identical function which is adapted to the aircraft specific requirements such as functional safety, a determined operation, the type of the data transmission and so forth.

Figure 4A:
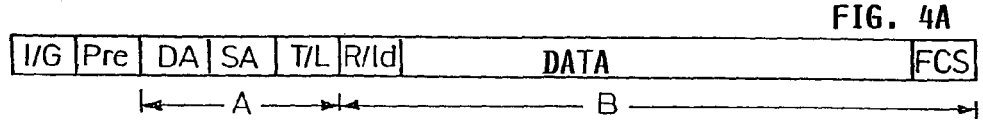
Figure 4B:
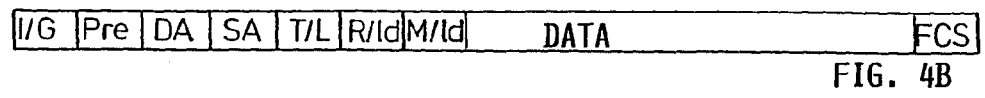
Figure 5:
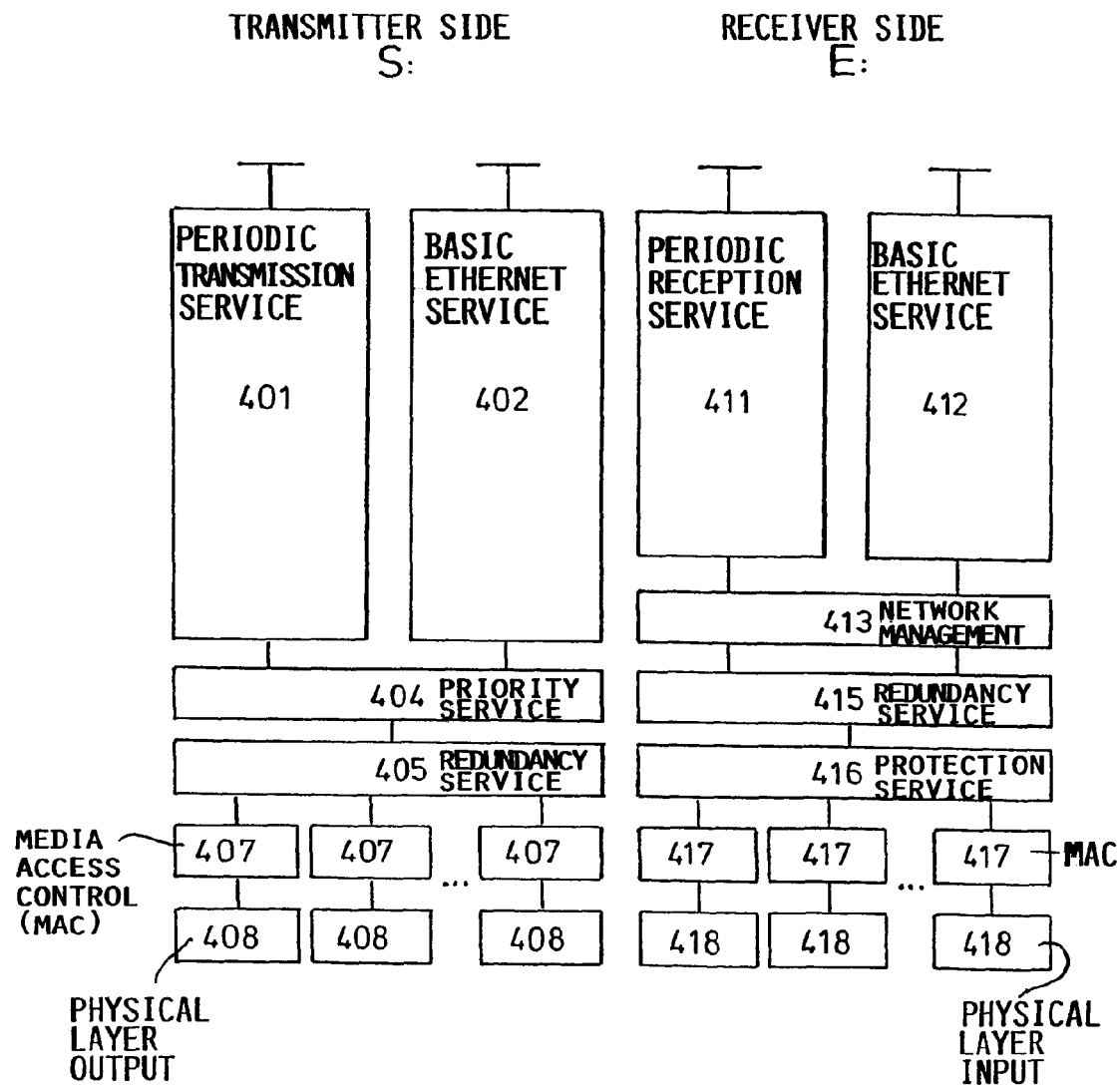
Figure 6:
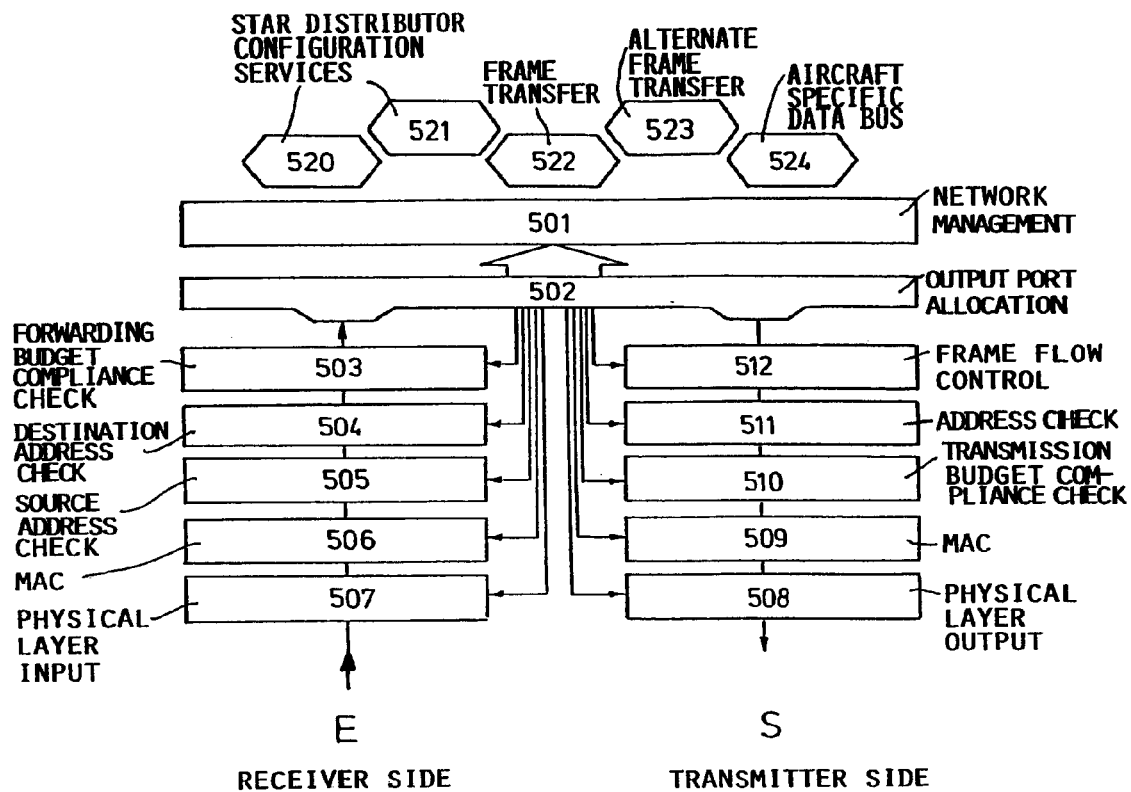

FIGS. 4A and 4B show respective examples of a frame structure of the data packets as determined by the International Standard IEEE 802.3 as further developed according to the invention. The "interframe gap" (IG) and the "preamble" (PRE) are data fields or data items which are given by the physical characteristics of the data transmission systems and which must be maintained for reasons of compatibility. The preamble PRE is followed by a frame header A including the data items or fields "destination address" (DA), "source address" (SA) and "type/length" (T/L) which must be maintained for the same compatibility reasons. These data items or fields contain or transport the control information that belong to the data transmission link level or layer TWO of the OSI-model. All fields or data items in this transmission system comprise completely agreed upon values for reasons of a seamless cooperation with commercial components to assure the required interoperability and the successive transition or migration. This agreement is with the above mentioned standard. Contrary to the implementations employed for commercial use, the values employed according to the invention are adapted to the requirements of the aircraft industry and these values are administered by the aircraft industry. For example, the transmitter addresses and the receiver addresses are taken from the area of so-called locally administered addresses. These locally administered addresses are distinguished from commercial or globally administered addresses which can easily be checked. These locally administered addresses permit the installation of safety barriers. Even the content of the (type/length) field (T/L) is subject to a standardization which, however, permits a local administration of values which are also usable for the identification and selection of specifically adapted protocols.

Any expansion of the standards must be made only in an agreed upon manner in order to achieve the goals of the interoperability and the required migration. For this reason in FIG. 4A the field T/L in the frame header A is followed, according to the invention, by a field R/ID (redundancy identification) for identifying redundant frames in the frame body B. As will be described below, the content of this field R/ID is used on the receiver side for filtering identical, repeatedly received data frames.

An OSI network layer THREE or an OSI transport layer FOUR is not necessarily required in the case of a periodic data transmission. For this reason the Example of FIG. 4B shows an additional message identification field M/ID for the identification of the message, directly following the field R/ID for the redundancy identification. However, if a network layer and/or a transport layer become necessary, this field is shifted behind the field for the protocol control. Such a network and/or transport layer however, do not change anything with regard to the principle of the further development of the present data transmission system according to the invention.

According to FIGS. 4A and 4B the useful data portion referred to simply as data, follows the fields for the control information of the different protocol layers within the frame body B. The frame body B may, depending on the technology, have a size up to 1500 octets or bytes representing a standardized word length. In the present data transmission system it is of special importance to achieve short delay times. Therefore, frame sizes of about 256 bytes are preferred. The precise size to be implemented depends, however, for example on the actually provided number of inputs and outputs of the star distributors. The precise size also depends on the required maximum delay time for a transmission from one peripheral unit to another peripheral unit and on the acceptability of delay times as well as on the actual data traffic volume.

The end of the frame is formed by a field or data item FCS (frame check sequence) which contains informations for an integrity check. This integrity check is intended to inform the receiver with certainty whether the frame has survived its transmission through the data transmission system without any damage to the frame. This integrity check in cooperation with the employed algorithm for generating the 32-bit information improves the detectability of transmission errors by the factor of $10^7$. The use of this information will be described in more detail below.

Figure 5:
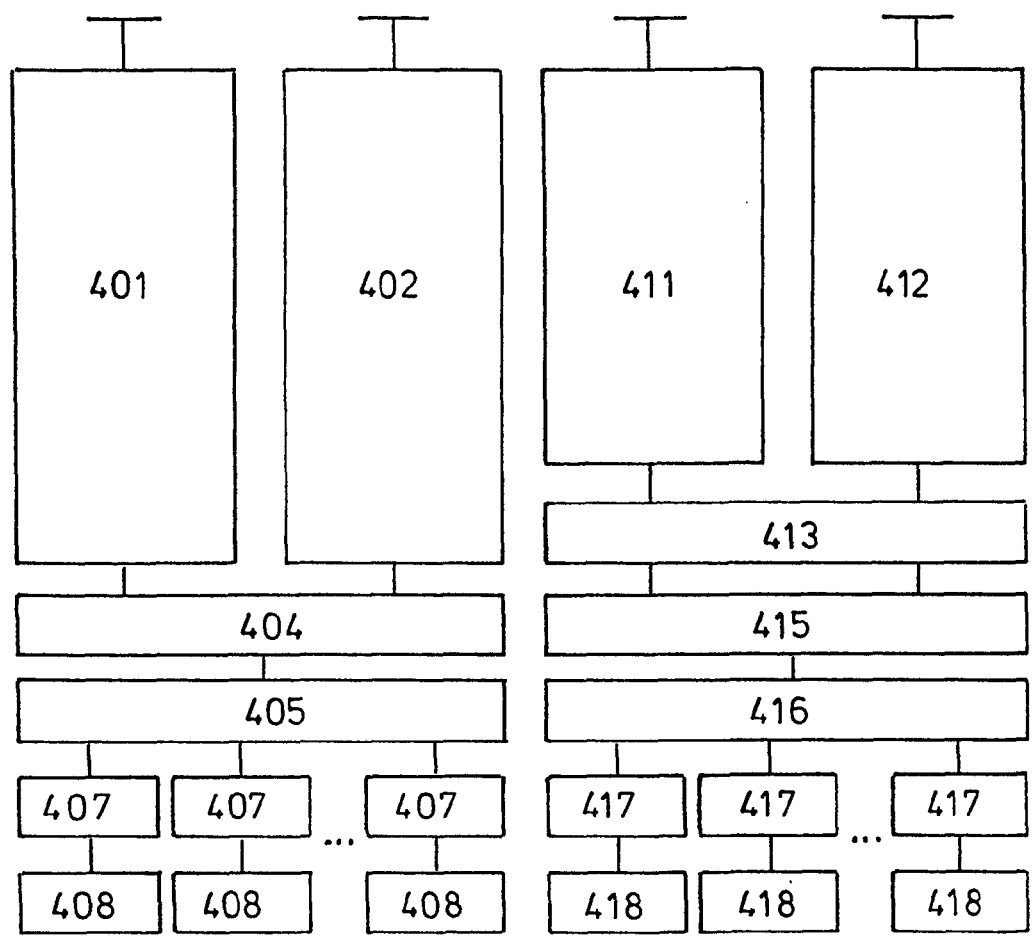
FIG. 5 illustrates a basic block diagram of a transmitter and receiver communication function of a peripheral unit of the present data transmission system.

FIG. 5 shows the structure of the communication functions implemented in the peripheral unit 302, whereby a distinction must be made between the transmitter side S and the receiver side E.

The communication functions comprise services 401 to 408 which represent transmitter functions and services 411 to 418 providing receiver functions. The services 402, 407, 408, 412, 413, 417 and 418 correspond to those that are defined in the basic "ETHERNET" used according to the invention. However, these services 401, 404, 405, 411, 415 and 416 are required for using the present data transmission system for safety critical applications. Where less critical applications are involved, individual services may be obviated. However, it is necessary that services with the same last digit must be implemented in pairs, 401 and 411, 405 and 415.

In accordance with the invention those services and components are important which are neither commercially known nor are they known for aircraft applications. The following text provides a detailed description of the services and components and their functions according to the invention.

The IEEE Standard 802.3 defines only aperiodic data transmissions which are significant for commercial operations. In air navigation, however, control tasks prevail which require data transmission that frequently have a periodic character. The periodic services 401 and 411 according to the invention provide the required functions in the present data transmissions system.

The periodic transmission service 401 performs the following functions: to assemble messages at predetermined intervals, to identify, to address and to encode messages into a transmittable format. Applications, for example a closed loop controller, inform the service 401 which messages shall be transmitted. This information may be provided either in a static manner at the time of the system configuration or dynamically during the transit time. In addition to the identification of the message, the provided information includes, for example the desired interval, the content of the message and the receiver or receivers. The transmitter service 401 determines from this information the required transmission budget and conforms that budget to the budget that has been allocated in a mandatory manner to the application during system configuration. The transmission service establishes a transmission profile based on all individual transmission jobs or tasks. A budget has been also allocated to the transmission profile, however now for all applications or uses of a peripheral device or unit 302 in common. Depending on the implementation, this establishment of the transmission profile takes place either during the time of the system configuration referred to as static inquiry or static contract or it takes place during the operational service following the start of the application program referred to as dynamic inquiry or dynamic contract. In any case, the operational determinism that is necessary for the safe operation of an aircraft, depends also on staying within the given budget. These budgets are to be determined during the design process and must be provided for the operational program at the time of system configuration either statically as a fixed part of the program or dynamically, for example as a loadable table.

The transmission protocols to be used are selected in accordance with the required functions or functionality. These transmission protocols also include the protocols for the periodic reception service 411. These protocols can be taken either from the stock of the International Standards (ISO, ITU, IEEE, IETF, SAE, Arinc, etc.) or they may be proprietary, that is they may be specific transmission protocols. In any case, these protocols will be selected depending on the requirements of the actual application.

The priority service 404 optimizes the transmission profile on the receiver side S and thereafter does not have any influence on the transition of the transmitted frames within the transmission system. The priority service 404 makes sure that the principle is applied that transmission requests are passed on to the next following service in accordance with the request's priority or importance. The following items influence the priority: what is the transmission characteristic namely whether an item is periodic or aperiodic, what is the time characteristic, namely a small or high interval rate, and what protocol is involved, for example TFTP, SNMP. How this information is supplied to the service depends on the implementation. The priority service 404 simultaneously makes sure that a minimum time spacing between two consecutive transmission frames is maintained. This minimum spacing or parameter is determined at the time of the system configuration as a function of the design process of the transmission system. This parameter is supplied to the priority service in the same manner as the other budget values. The priority service 404 does not communicate with its counterpart on the receiver side E. Thus, the use of the priority service 404 is optional and depends only on the transmission requirements of the applications that use the priority service. Whether or not the service is used is determined, at the latest, at the time of the configuration of the peripheral devices or units.

It is the task of the redundancy service 405 to assure a transparent transmission of the transmission frames through parallel connected subnets. For this purpose the service 405 provides each received transmission frame with an unambiguous identification. This identification makes sure that the receiver recognizes identical frames within the maximal variations of the frame transmission times through the subnets of the data transmission system. Basically, any available subnet can be selected for any individual transmission. For this selection the service is provided with respective control data or information by a call up application parallel to the transmission frame to be transmitted. Subsequent to the redundance identification, identical copies of the transmission or transmitter frame are passed on to all selected media access controls (MAC) 407.

In view of the importance of the media access controls or services 407/417 for the function of the data transmission system according to the invention, these services will now be described in more detail. Thereafter, the services 408/418 of the physical layer or level (PHY) will also be explained in more detail.

The media access control service (MAC) 407 in the transmitter section and the corresponding MAC service 417 in the receiver section E interconnect all tasks which are necessary for the logical access to a subnet. With regard to the transmitter section this means the formatting of the transmission frame in a format suitable for the medium, which in this case is the IEEE 802.3 frame. The transmitter MAC service 407 further produces integrity information and controls the access to the medium. The service 407 further transfers the transmission data in terms of octets or bytes to the physical layer 408 which is OSI layer ONE. The services for the receiver section perform the following functions: Receiving of octets or bytes from the physical layer 418, checking of the integrity information in the MAC service 417 and transferring of the received data to the protection service 416.

The MAC service 407 receives the data to be transmitted and in parallel thereto it also receives informations regarding the receiver or receivers and regarding the type of the protocol of the layer that provides the instructions. Based on its knowledge of its own address, the service 407 produces a frame according to IEEE 802.3. On this frame the integrity information is produced with the aid of an algorithm for a cyclic redundancy check and the result of this check is added or appended onto the frame. At this time the frame is secure and ready for transmission.

The data transmission system according to the invention is constructed in such a way that the inherent access control according to IEEE 802.3 is not necessary. Such inherent access control is known as carrier sense multiple access with collision detection (CSMA/CD). Similarly, the present system is so constructed that a comparing of the transmission data with the reception data for recognition of a collision is not necessary. Thus, the services 407 and 417 can be placed into a decoupled mode in which they can transmit and receive simultaneously.

The services 408 and/or 418 of the physical layer are by definition constantly decoupled from one another so that in these services no comparing between transmitted and received information can take place. Thus, it is necessary for the intended operation to provide a wiring or cable connection that connects each peripheral unit exclusively either directly with but one other peripheral unit or with but one star distributor, please see the connections or busses 320 in FIG. 3. Depending on the election of the physical layer, the status of the transmitter conductor and the status of the receiver conductor can no longer be ascertained through external conditions. Therefore, a transmission of at least two additional status signals through the services 408 and 418 is necessary. These status signals are mutually exclusive and are selected dependent on the fact of the own reception of permissible signals (status signals or frames) of the opposite side. If, for example a status signal of the opposite side 418 is received, the service 408 sends a signal S1 otherwise it sends a signal S2. This method makes it possible for both services, so to speak, to ascertain the status of the connection between the two services in an unambiguous manner free of doubt.

The service 408 comprises additionally a component which determines a faulty continuous transmission of invalid signals such as frames that are too long, a random sequence of invalid bits, or the like. When such faulty signals are recognized, the service 408 prevents their further transmission after a fixed time that is standardized in the IEEE 802.3 standard. Independently of the operation of the service 408, the service 418 rejects all invalid bit sequences while the service 417 rejects all invalid frames.

The service 408 in the physical layer on the transmitter side S comprises a signal transformer. Similarly the service 418 on the receiver side E comprises a signal transformer. These signal transformers provide protection against electrical interferences. For this purpose the signal transformers have characteristics which correspond to the International Standard values as specified in IEEE 802.3 or RTCA DO-160D and Arinc 646.

An additional protection service 416 is installed in any receiver of the peripheral units, the star distributor or converter or transformer in order to minimize any influence of a further possible fault occurrence. Such a fault occurrence manifests itself in the form of a sequence of identical and valid frames having an extremely short interval rate which are received in a subnet. The service 416 reacts to such a fault depending on the operational necessity either with a complete shut-off of the respective MAC service 417 or with the application of a receiver budget. When the protection service 416 reacts with the application of a receiver budget, the number of the excessively received frames is reduced to a number of maximally to be expected frames. This number of maximally to be expected frames is determined at the time of the system configuration in accordance with the design process of the transmission system and the respective service is informed of this value in the same manner as the other budget values.

The service 415 checks whether there is a multi-reception of frames which may arrive either through different subnets or which may arrive due to a faulty transmitter or transmitters. This checking is performed on the basis of the unambiguous redundancy identification that has been inserted by the service 405 on the transmitter sides. Additionally, the integrity information also referred to as cyclic redundancy check, inserted by the service 407 on the transmitter side may be used as a further information for comparing. When a frame arrives, the service 415 checks whether an identical frame has already arrived and it also checks whether any already arrived frame is valid. If the check shows that this is the case, the actual or currently arriving frame is rejected. If the check shows that such a frame has not yet arrived, the informations received from the comparing are stored in a table and the frame is passed on to the service 413. The informations resulting from the comparing involve, for example, a redundancy identification, a sender address, CRC (cyclic redundancy check) and so forth. However, such table entries become obsolete. Therefore, they are declared invalid after a time period that is predetermined by a traffic characteristic. However, these table entries, even though they have currently been declared to be invalid, can still be used for later checks. Now, further entries or new entries may be made in the table. Since the higher order protocol layers now do not have any information regarding the redundant availability of frames, the service 413 contains additional network managing functions. These additional network managing functions include the recognition and reporting of operational anomalies, for example a permanent loss of a subnet or of a sender or transmitter on a subnet, or a multiple reception for each subnet and so forth, and the preparation of relevant statistics.

The service 413 is implicitly contained in all protocol standards. This service 413 is always used when the next higher protocol layer provides a plurality of options. In the case of the service 413, the content of the frame field "type/length" (IEEE 802.3) is evaluated and the frame is passed on to the respective protocol element of the next higher protocol layer.

The periodically operating reception service 411 provides the function of supplying periodically received parameters to the requesting applications in contract form, that is, in an agreed upon format. These applications inform the service either statically at the time of the system configuration or dynamically during the operation which parameters are to be transferred. A closer definition of a parameter comprises, for example, among other things, its identification, the sender, the message to be transmitted, the expected format, and the point of transfer or delivery.

In certain instances it is necessary to obtain an information regarding the "freshness" of the transferred parameter.

It is understood that such an information enables the application to ascertain whether within the interval that is expected by the application, a new, valid reception of the parameter has taken place. In the simplest instance this parameter is a status indicator or flag which is set by the transfer of the parameter through the periodic reception process and which is reset during the reading by the application. A time marker serving the same purpose provides, however, a substantially more precise possibility to ascertain the reception point of time. If the time marker is already produced by the sender when it generates the parameter, then a testing independently of any transporting, of the sequence and timely validity for the own calculations becomes possible. The enforced testing makes it possible to synchronize all time marker generators over a central clock, such as GNSS and respective auxiliary systems. Such a clock signal permits the correlation of all received on-board parameters and parameters received from a ground station, with their own values and calculations on board.

Figure 6:
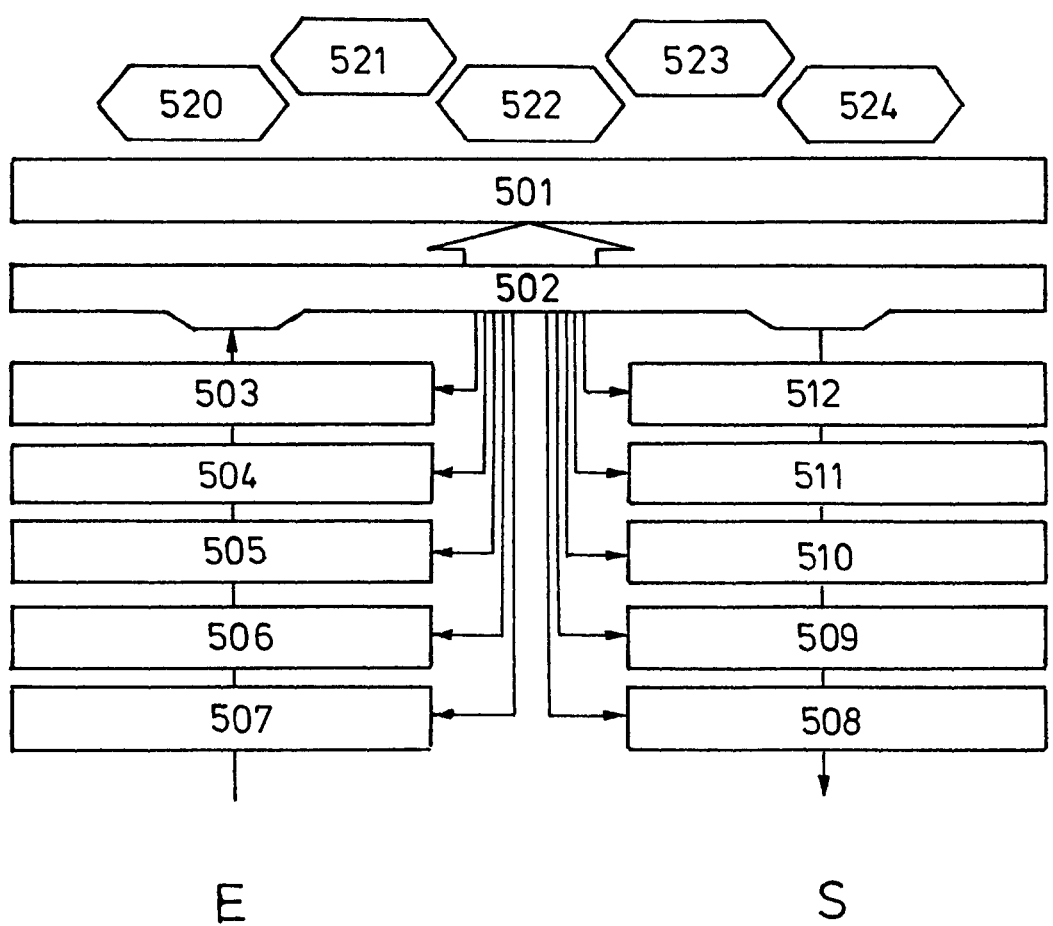
FIG. 6 illustrates the basic construction of a star distributor having a transmitter section and a receiver section.
Figure 1:
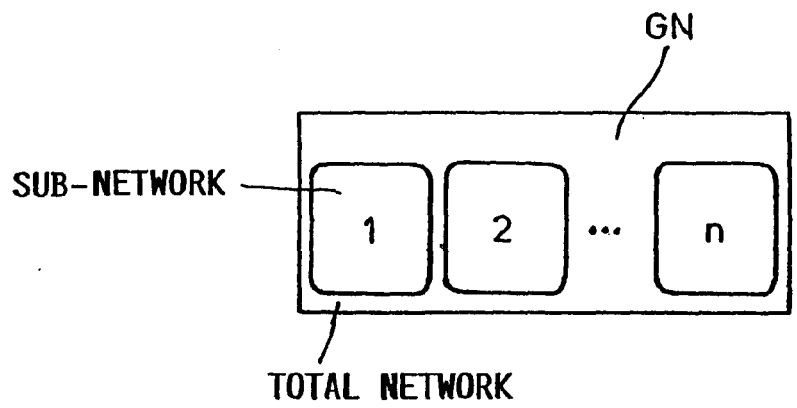
Figure 2:
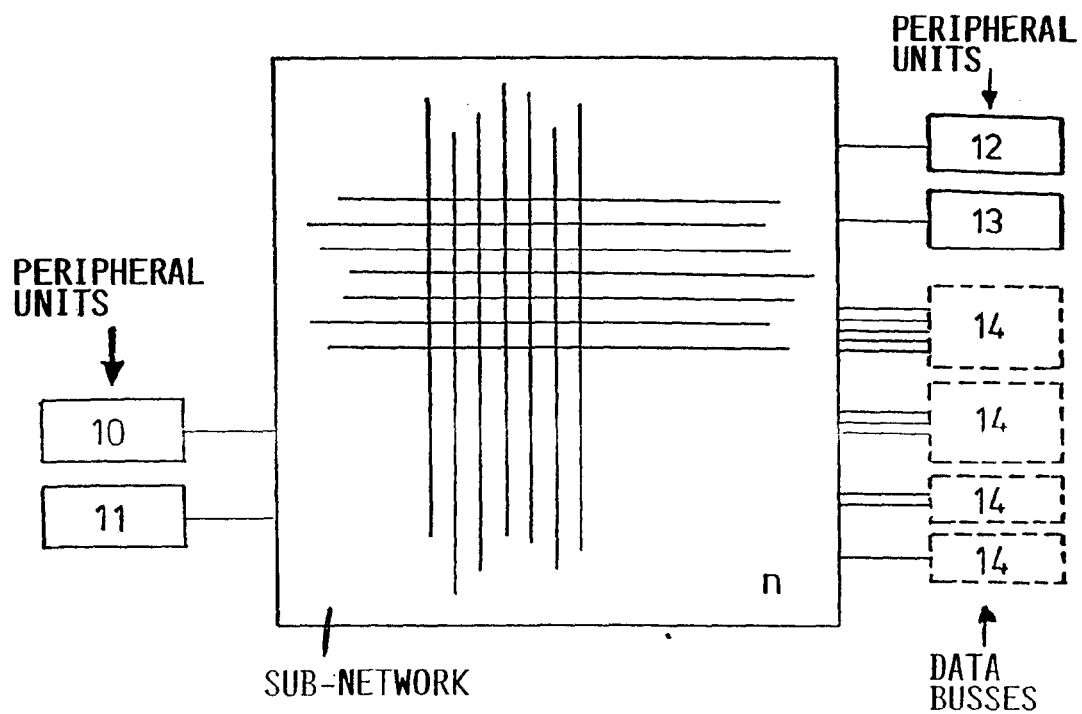
Figure 3:
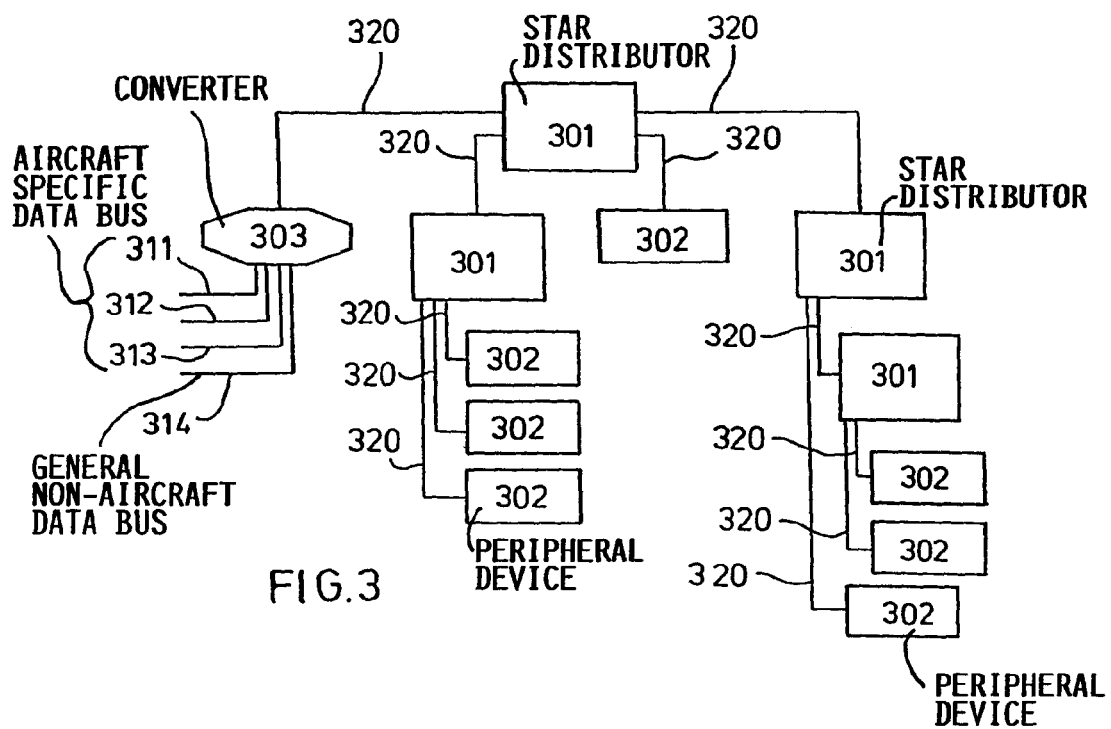

Peripheral devices or units 302 which contain the above described data transmission functions, communicate with one another either directly or through interconnected star distributors 301. FIG. 6 shows the functions of a star distributor 301 according to the invention.

Referring to FIG. 6, the following text describes the services by which a frame passes on its way through the star distributor 301. Then, the functions will be described which are implicit in the selected or particular implementation due to decisions made during the design process.

The services 507 and 508 correspond completely to the service of a peripheral device or unit 408 and 418. Thus, no further description thereof is necessary at this point.

The service 506 corresponds to the service of a peripheral device 407. At this point a special requirement should be mentioned. This requirement involves the need for not only testing but also passing the integrity information or value, also referred to as frame check sequence, to the output or outputs together with the data portion of the frame.

The service 505 checks whether the frame comes from the devices or units from which the frame is expected at the respective input or inputs. For this purpose, the source address contained in the frame field is compared with transmitters permissible for this input and stored in a table. Thus, if a frame comes from a permissible transmitter, the frame is passed on to the next service. However, if the frame does not come from a permissible transmitter, the frame is rejected and the network management service 501 is informed accordingly.

The service 504 checks whether the frame may be transmitted or passed on to one or several outputs. For this purpose the destination address contained in the respective frame field is compared with the permissible receivers stored in a table. If the service 504 finds one or several receivers, the frame can be passed on. For this purpose, the service provides the frame with an internally used additional information regarding which of the outputs of the star distributor are to be used before the service passes the frame to the forwarding budget compliance check service 503.

The service 503 checks whether the frame to be passed on is still within the budget provided for this purpose. This budget is defined by the cooperation of parameters suitable for describing the time characteristic of frames and of the frame destinations. For example, the following parameters are involved: the minimal time spacing of two frames following each other, the number of frames that must satisfy this minimal time spacing between two neighboring frames, the length of the frames, the variability of the time sequence of the frames, the costs of passing on of one frame to one or several outputs, the time dependent assigned credit for the passing on of the frames, the maximum assigned credit, and so forth. The just mentioned check takes place on the basis of the destination address (DA) present in the frame itself, whereby the actual budget for this destination address is compared with a budget necessary for passing the frame onto the destination address. If passing or transmitting the frame is still within the available budget, the transmission is performed, otherwise the frame is rejected.

The service 502 uses the already tested destination address and makes sure that the frame is passed to the respective output or outputs. The existing multitude of implementation possibilities for this passing on purpose is not relevant in this context and depends on the required optimization. However, with regard to the possibilities of suitable implementations for the frame transfer, reference should be made to a substantial restriction. The fragmentation of frames, for example into "cells" for the purpose of a finer loading of the internal transmission structure, for example data busses, is capable of changing or varying the sequence of the frames that are successfully transferred to the output. Such a feature prevents the predictability or rather the determinism of the frame delivery. Therefore, any implementations which use this frame fragmentation are not suitable for the purposes of a data transmission system according to the invention. Frame fragmentation must be avoided.

The service 512 is part of the function of an output. This service is used in order to control the flow of frames. Two subfunctions are available, namely storage management and latency control, whereby the storage management is not relevant in this context because it is specific to any particular implementation. The subfunction of latency control makes sure that only as much space is allocated for the frames that a maximum residence time of frames in a respective "switch" is assured or guaranteed.

Frames which cannot maintain this maximum residence time are rejected in order to avoid influencing frames which can maintain such time. The required setting of parameters must contain informations which are suitable to guarantee this maximum residence time. The definition for ascertaining the internal residence time shall be the time which can be measured between the receipt of the first bit of the first octet or byte at the input through the service 507 and the emission of the first bit of the same octet or byte at the output of the service 508. In case internal time considerations are taken into account, this first bit of this octet must also be taken into account.

The following text is an example of the considerations that must be made in this context because the internal latency depends primarily on the waiting time at the output. Thus, the size of the memory provided at that output is an important parameter. Further, the speed of the traffic filtering at the input, namely the services 503 to 505, is a value that must be considered. Both parameters together already permit a relatively precise control of the internal residence time.

The service 513 also forms part of the function of an output. The service 513 is optional and is used in order to permit the priority controlled flow of the frames under certain conditions it is desirable to dispatch frames with a higher priority or significance separately and with priority relative to frames having a smaller significance. Independently of the number of steps or levels of significance, and independently of the internal implementation of this ability two methods can be realized. The significance can be indicated either explicitly or implicitly. In connection with the explicit indication of the significance or priority, the information regarding the significance of the frame is provided within the frame itself. An implementation of the explicit indication of the significance or priority information can be accomplished either through methods that conform to the IEEE 802.1 standard or proprietary methods may be used for the implementation according to the invention. On the other hand, in connection with the implicit indication of the frame significance, the respective informations can be retrieved from the inherent data that are provided in the frame in a standard manner. These inherent data are also found, as in connection with the service 503, on the basis of the destination address (DA) provided in the frame itself. Alternatively, and according to the invention, the coordination can also be accomplished on the basis of the transmission address (SA) or on the basis of the type or the length of the frame that may be implicit or explicit. A frame can be treated with preference, depending on the decision criterion. If frames with the same significance or priority are already waiting, these frames are first transmitted.

It is possible to expand the service 513 to permit treating frames of a lower significance or priority in accordance with the rules applicable to frames having a higher significance or priority. The following scenario describes, as an example, under which conditions or circumstances such a treatment may take place. Assume, that a frame of a lower significance is waiting to be transmitted. Due to the uninterrupted processing, either of frames having a higher significance or of frames with the same significance, but which have been waiting for a longer time, the processing of the frame assumed in the example is not undertaken for a certain waiting time. For this frame a maximal waiting time is defined within the actual significance or priority, whereby this frame is now internally allocated to a higher significance. If frames with this higher significance are already waiting, they are first transmitted. Depending on the number of steps or levels of significance, this scenario may take place several times until the frame reaches a predefined maximum significance.

In analogy to the transmission budget that is realized in the service 401, a function 510 may be integrated on the transmitter side of the star distributor 301. This function 510 assures the compliance with a determined transmission budget. Thus, identical parameters are to be used, if applicable, with values adapted to the position within the network. Especially the assurance of a minimum time spacing between sequentially following transmissions is of interest. However, this service 510 is optional because, although it improves the predictability of the used budget, it makes the implementation somewhat more complex.

The service 501 corresponds substantially to the service of a standard service described in IEEE 802.1. However, differing from the standard service, the present service has the task to collect data regarding the performance and errors or faults of the star distributor and of the network sections connected to the star distributor. The task also includes the evaluation of the collected data and to provide the results of the evaluation to any subscribers such as the network manager. For this purpose it must be assured that reading access or writing access is provided to the data made available by the functions according to the invention. Examples for the reading access are: number, origin, destination, and timing, for example of a flight leg, of frames that have been rejected due to an exceeded receiving budget, internal latency times, duration, etc. Examples for the writing access are: resetting of timers and clocks, selection of the modes of monitoring, the sequential counting of, for example the number of errors since the start, counting of periodic resettings, for example errors per second, setting of threshold levels for an alarm and so forth. Furthermore, the service 501 has to perform air traffic specific functions. The index or catch word in this context would relate to built-in test equipment (BITE), monitoring functions, for example power-on self test (POST), and the interface to the outside of the system, such as an on-board maintenance system (OMS) and to provide for these functions. These functions depend on the manufacturer or system integrator of the aircraft who uses this data transmission system.

Functions forming a group are either part of the configuration of the star distributor, such as the services 520 and 521, and form a basis for the functional implementation of the star distributor, including services 522 and 523 or further developments for the inclusion of other aircraft specific data buses such as a service 524. These services round out the overall function of the star distributor and additionally delimit the data transmission according to the invention from commercial implementations.

The service 520 serves for the configuration of the star distributor depending on the actual situation. Two scenarios are possible relative to the design of the entire data transmission system and one of them may be selected. Once scenario involves the recognition of the position of the transmission system relative to the physical position within the aircraft architecture. This recognition may be accomplished by a so-called conventional pin programming in which a certain number of plug contacts is hardwired to selected voltages. Alternatively an external structural component integrated into the aircraft structure may be used such as a read-only memory which contains information regarding the position of the system. In such a case the physical position is, on principle, independent of the network topology. The second variant or scenario takes advantage of this network topology and recognizes the position of the star distributors within the topology relative to one another. In this implementation the network topology is essentially independent of the physical position. The basic configuration sequence shall be described after introducing other relevant services.

Generally, the transmission or passing of frames takes place with the aid of the service 502 which uses the information of the service 521. The services 503, 504 and 505 also use the respective informations from the service 521. In this connection it is not important how the services are implemented and how they exchange their informations. It is further unimportant where the service 521 deposits or stores this information, either internally within the star distributor or externally, for example in a structural component integrated into the aircraft for position determination. According to a simple implementation, the service 502 has available a statically produced table. On the basis of this table and with the aid of the destination address, the service 502 ascertains the outputs required for passing or transmitting the frames. Exclusively statically defined informations are permissible for use in the data, transmission system according to the invention which deviates from commercial systems. Due to the flexibility that is necessary in the handling of initially unknown network components, commercial systems use methods of so-called "learning and forgetting" of the interrelationships between destination addresses and star distributor outputs. Such conventional methods do not meet the requirements of predictability or determinism in the data transfer in aircraft. Such conventional methods also do not guarantee the required operability of the data system according to the invention. Therefore, these conventional methods of learning and forgetting may not be used in the implementation of the system according to the invention.

During the time of configuring the service 521 the information must be available to the service 521, which the service 521 then provides for the service 502 during the operation of the system. However, it is not necessary that the information is made available to the service 521 in the exact format in which the services 502, 503, 504 or 505 require these informations. The exact information format may be provided either with a suitable loading device directly connected to the star distributor or it may be provided by a loading device connected to the network, whereby the latter loading device must be able to reach the star distributor. The physical interfaces and protocols for this purpose are not significant for the implementation of the present data transmission system. However, devices and methods are preferred which meet other aircraft specific standards, for example Arinc. The selection of the data to be loaded is performed on the basis of the results provided by the service 520. For example, the selection of information to be loaded in the case of a loading device directly connected to the star distributor, can be easily made while utilizing the physical position. The recognition of the position is performed by the user of the loader, whereby the user also selects the information to be loaded. In the example where a star distributor is to be loaded through a network connection, a suitable protocol is necessary. This protocol provides the loader with the definite position of the star distributor, physically and logically and also provides for the selection of the information to be loaded. The selection of the just mentioned protocol depends on the implementation of the present data transmission system. An alternative embodiment of the present system involves a fixed embedding of the information that is accessible to the service 521, into the star distributor or into the structural component that is integrated into the aircraft for a position determination. However, due to the lack of flexibility, such an alternative embodiment is useful only in a few implementations. Yet, this alternative embodiment is mentioned here because the data transmission system according to the invention can be implemented in this manner.

The services 522 and 523 provide the functions which influence the internal function sequence of the system. The service 522 makes certain within the function of the service 502 that the frames received in the star distributor are passed on in a predictable form. The following example describes the function of the service. It is assumed that the inputs to the star distributor are arranged on a circle. As a matter of principle, all inputs are always served in the same sequence, for example, clockwise. Each frame which has conformed to the requirements of the services 503 to 507 is reported for further passage independently of each input and independently of the service 522. It is basically possible that within an interval which depends on the implementation and is not described in further detail, several frames may be logged on for further passage. It is assumed, for example, that the service 522 has last passed-on a frame of the input N. If now a further frame is reported at the input P, this further frame is immediately serviced. It is not permissible to check any inputs that under certain circumstances may be positioned between the inputs N and P whether frames are present at these intermediate inputs for passing on. Thereafter, the service waits at the input P for further messages. If now simultaneously several frames are reported for further passage, first that input is served which in the above mentioned sequence is closest to the input P. This operation takes place until all messages have been processed and all frames have been passed on. If, during any processing time of one or several frames, one or more additional frames are reported, the processing of the additional frames will take place respectively when the current processing is completed. The just described example merely describes the logic characteristic or function, but not any implementation.

The service 523 is an optional further development of the basic function of the present data transmission system. In case of a network fault the service 523 provides alternate routes for passing on or transmitting the frames. For this purpose alternate routes information is to be provided for the service 521 in addition to the standard routes. It is the task of the service 523 to detect network faults and to report such faults as an active or busy route to the service 521. In this connection it is insignificant for the interaction of the services 521 and 523 how these services are implemented and how they exchange their information. For example, in a simple implementation a marking is available for the service 521 for each possible output port within a statically produced table with the aid of which the service determines the output ports that are valid for passing on a frame. Due to the effects on the network configuration, this function is not a central component of the present data transmission system. However, this function may be optionally integrated into the present system.

The service 524 presents a further development for including other aircraft specific data buses, for example Arinc 429 into the present system. Basically, the physical medium connected to the star distributor is of secondary significance. As mentioned above, the function of a star distributor for the data transmission system according to the invention is settled on the OSI layer TWO. So far it was assumed that in addition to the frame format according to IEEE 802.3, the physical layer also corresponds to this standard. However, it is quite possible to pass on frames according to IEEE 802.3 independently of the physical transport medium. In that case all rules and services defined above apply. The functions of the services 507 or 508 depend on the selected medium in analogy to the above description.

The most important functions and characteristics of the data transmission system according to the invention will now be summarized. Additionally, further functions are possible which expand or improve the areas of application, the operational safety, as well as other aspects depending on the concrete usage or application.

A collision-free transmission is made possible by the present system because all transmissions are coupled with one another by bridge functions. Such bridge functions make collisions of data packages impossible. The coupling time of the bridges and the mechanism for switching on one correct output channel or several correct output channels is determined by the bandwidth of all input channels and of the output channel or channels.

Contrary to conventional networks, according to the invention, point to point connections are also possible.

A virtual net is provided contrary to conventional networks because connections are also possible within several groups. These intergroup connections are possible due to a table controlled group addressing.

A data packet integrity is assured by the present system because all data packets are checked or tested within a bridge for their integrity and treated accordingly. The data packets must be manipulated when the addresses are transferred from one schema to another schema, for example when there is a transition from Arinc 429 to an IEEE standardized bus.

The priorities influence the sequence of the treatment within a bridge at two points, namely at the reception and at the time of transmitting. During reception a conventional bridge processes all inputs in sequence. The priorities are used as a criterium for the selection of the next input to be processed or handled.

In conventional bridges during the transmission the data packets are caused to wait in line without taking priority into account. The priorities permit the sorting of data packets. Basically, priorities can be varied within a bridge in a dynamic manner on the basis of aging for a corresponding new sorting or rearrangement of priorities.

A limited data block length is assured by limiting the block length to a minimal value of, for example 64 octets or bytes, including the prescribed address and control fields, whereby a fine resolution (granularity) of the data transmission is achieved. Such fine resolution is particularly required when the present transmission system is used for image or audio transmissions, whereby a function is realized that involves an ATM (asynchronous transfer mode).

The invention also provides a transparent rerouting when an output is defective. In that case an alternative entry in a routing table selects another output for the dispatch of a data packet. The just mentioned routing table is a static table and a dynamic method in combination with the table is available for expanding the peripheral units of the present system. Even if no faulty output is present, the data flow between the bridges can be optimized by way of reroutings.

An active transmitter control is also provided by the invention. If a fault occurs in a transmitter, the respective entry in the table is switched off and the data flow from the faulty transmitter is ignored.

A fault recognition and fault treatment are accomplished by the static structure of the table which permits recognizing with certainty devices which were connected to certain inputs in error. Errors or faults in the wiring or cabling between peripheral units and the bridges are recognized by a bridge even in case of a pause in the transmission of the respective peripheral unit. For this purpose the bridge transmits inquiries or interrogatories at precisely defined time intervals and at precisely defined conditions. The peripheral unit answers these interrogatories and the bridge evaluates the answers.

The invention also provides an efficient network management (NM). All functions of the on-board communication are equipped with interfaces. A separate process in the data transmission system monitors the functions and the performance. The separate process also produces statistical information and influences the configuration and reports faults in the system to independent external systems.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A data transmission system comprising a total network that comprises a plurality of sub-networks, wherein:
a first sub-network among said sub-networks comprises a first star distributor and a plurality of first peripheral units respectively connected by a corresponding plurality of individual physical data channels to said first star distributor;
each said sub-network is implemented in a link layer (layer TWO) of an open systems interconnection OSI reference model;
said first star distributor comprises a first switch implemented in said link layer (layer TWO) of said OSI reference model;
said first star distributor is connected to said first peripheral units respectively via said individual physical data channels so as to form a cross-distributor for all of said first peripheral units connected to said first star distributor, so that each of said first peripheral units is able to communicate directly with each other one of said first peripheral units via said cross-distributor using exclusively media access control MAC addresses on said link layer (layer TWO) of said OSI reference model.

2. The data transmission system according to claim 1, wherein said sub-networks are further connected to each other on a network layer (layer THREE) of said OSI reference model.

3. The data transmission system according to claim 1, wherein a second sub-network among said sub-networks comprises a converter adapted to connect said data transmission system to at least one other external data transmission system.

4. The data transmission system according to claim 3, further in combination with said at least one other external data transmission system which comprises:
an aircraft-specific data bus system that is implemented according to an ARINC standard and that is connected to said converter; and
a non-aircraft-specific general data bus system that is not implemented according to an ARINC standard and that is connected to said converter.

5. The data transmission system according to claim 1, wherein each one of said sub-networks comprises a respective star distributor comprising a respective switch implemented in said link layer (layer TWO) of said OSI reference model, and further comprising a superordinated star distributor that is connected via additional individual physical data channels to said star distributors of said sub-networks and that comprises a further switch implemented in said link layer (layer TWO) of said OSI reference model.

6. The data transmission system according to claim 1, wherein said peripheral units include at least one receiving peripheral unit, and further comprising a data protocol based on a frame structure determined by an IEEE standard (Institute of Electrical and Electronic Engineers), said frame structure further including a redundancy identification field (R/Id) for filtering identical, repeatedly received frames in said receiving peripheral unit.

7. The data transmission system according to claim 6, wherein said frame structure further includes a message identification field (M/Id) for identifying a message in case of a periodic data transmission.

8. The data transmission system according to claim 1, wherein at least one of said peripheral units comprises communication functions implemented therein, said communication functions including periodic transmission and reception functions (401, 411) for assembling, identifying, addressing and encoding messages into a transmittable format.

9. The data transmission system according to claim 8, wherein said at least one peripheral unit further comprises a priority service (404) implemented therein, and wherein said priority service is adapted for sorting a transmission of requested data sets in accordance with a respective priority of each of said data sets, said priority being determined by a transmission characteristic, a time related characteristic, and a protocol type of each said data set.

10. The data transmission system according to claim 1, wherein at least one of said peripheral units is a receiving peripheral unit, said sub-networks are arranged or connected in parallel, at least one of said peripheral units (302) is a transmitting peripheral unit having implemented therein a redundancy service (405) for a transparent transmission of frames, and said redundancy service provides each of said frames with an identification for evaluation by said at least one receiving peripheral unit.

11. The data transmission system according to claim 10, wherein said transmitting peripheral unit, further comprises at least one media access control service (407) implemented therein, and said media access control service controls a logic access to a respective one of said sub-networks by said frame.

12. The data transmission system according to claim 11, wherein said media access control service respectively acts on one physical layer (408) of said OSI reference model for transmitting respectively one additional transmission status signal and one additional reception status signal.

13. The data transmission system according to claim 1, wherein said star distributor (301) comprises a receiver section (E) and a transmitter section (S), said receiver section comprises a receiver media access control service (506) and a physical layer input (507) of said OSI reference model, and said transmitter section comprises a transmitter media access control service (509) and a physical layer output (508) of said OSI reference model.

14. The data transmission system according to claim 13, wherein said receiver section (E) further comprises at least one service (505) for checking a validity of a source address of a frame with reference to a respective receiving input port of said receiver section at which said frame was received.

15. The data transmission system according to claim 13, wherein said transmitter section (S) further comprises at least one service (511) for checking a validity of a destination address of a frame with reference to a respective transmitting output port of said transmitter section at which said frame is to be transmitted.

16. The data transmission system according to claim 1, wherein said star distributor comprises a static allocation table in which respective receiver addresses of said peripheral units are statically allocated to respective output ports of said star distributor, and in which respective transmitter addresses of said peripheral units are statically allocated to respective input ports of said star distributor.

17. A data transmission system comprising a total network that comprises a plurality of interconnected sub-networks, wherein:

a first sub-network among said sub-networks comprises a first star distributor and a plurality of first peripheral units respectively connected by a corresponding plurality of individual physical data channels to said first star distributor;

a second sub-network among said sub-networks comprises a converter;

said data transmission system further comprises an aircraft-specific data bus system that is implemented according to an ARINC standard and that is connected to said converter; and said data transmission system further comprises a general data bus system that is not implemented according to an ARINC standard and that is connected to said converter.

\* \* \* \* \*

UNITED STATES PATENT AND TRADEMARK OFFICE
CERTIFICATE OF CORRECTION

PATENT NO.     : 6,925,088 B1
DATED          : August 2, 2005
INVENTOR(S)    : Moreaux It is certified that error appears in the above-identified patent and that said Letters Patent is hereby corrected as shown below:

Drawings,
Replace sheets 1-4, with the attached sheets 1-4.

Column 3,
Line 39, after "data", replace "bus'" with -- bus --;

Column 12,
Line 59, before "transmission", replace "data," with -- data --.

Signed and Sealed this

Seventh Day of February, 2006

JON W. DUDAS
*Director of the United States Patent and Trademark Office*